May 2, 1933.     E. F. PLUMB     1,906,807
WINDSHIELD HEATER
Filed March 3, 1930
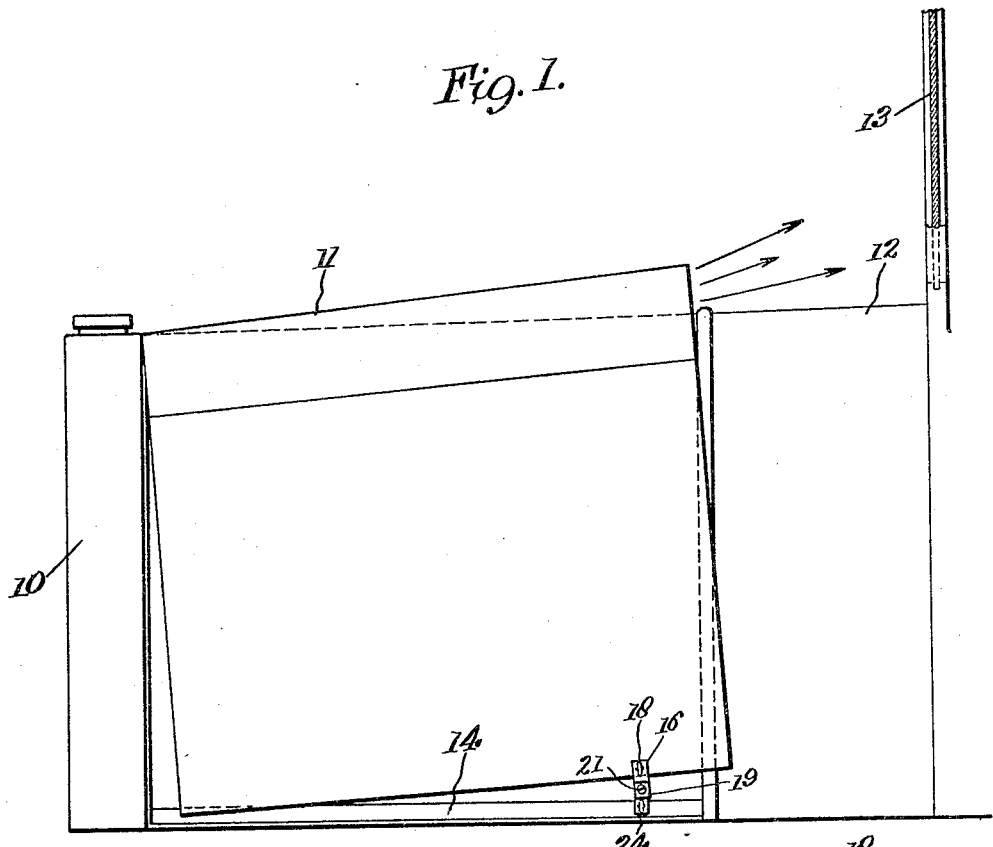
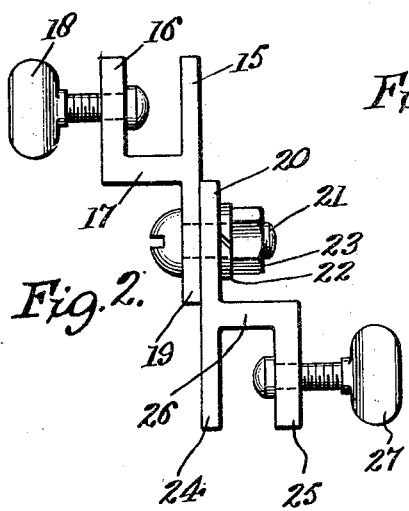
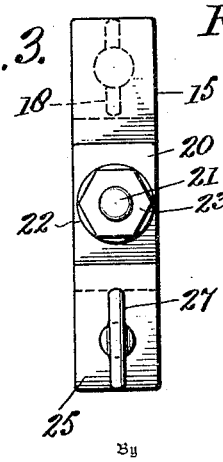
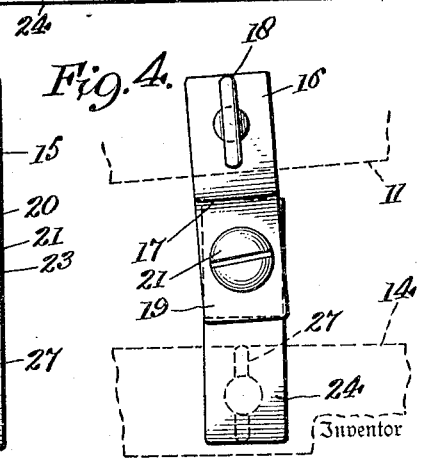
E. F. Plumb
Wilkinson & Mawhinney
Attorneys.

Patented May 2, 1933

1,906,807

UNITED STATES PATENT OFFICE

EDWARD FIELDS PLUMB, OF NEW MILFORD, CONNECTICUT

WINDSHIELD HEATER

Application filed March 3, 1930. Serial No. 432,814.

The present invention relates to improvements in windshield heaters and has for an object to prevent the formation of condensation on the windshield or the freezing of snow or sleet thereon in a manner which will obscure vision through the windshield and is attended with hazardous driving conditions.

Another object of the invention is to provide an improved hood attachment whereby the rear portion of the hood, or one side thereof, may be elevated slightly to permit the heat generated by the internal combustion engine of the automobile to pass about the cowl and be directed against the windshield to thereby melt the condensation, snow or sleet and insure at all times a clear windshield glass.

A further object of the invention is to provide a simple form of adjustable clamp device for holding the hood in the elevated position, admitting of the quick attachment and removal of the clamp.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a fragmentary side view of an automobile, with the windshield indicated in fragmentary section, and showing the improved attachment in place with the rear part of the hood elevated.

Figure 2 is an edge view of the improved adjustable clamp taken on an enlarged scale.

Figure 3 is a rear view of such clamp, and

Figure 4 shows the front view thereof with parts of the hood and body indicated in dotted lines.

Referring more particularly to the drawing, 10 designates generally the radiator of an automobile driven by an internal combustion engine contained within a hood, one side of which is indicated at 11. The cowl is represented at 12 and the windshield at 13, these parts occupying the usual positions found on the conventional automobile.

The hood 11 is usually hinged along a central longitudinal line extending between the radiator 10 and cowl 12 and both sides of the hood are adapted to fold down from this central pivot or hinge joint and to close the space containing the internal combustion engine and other associated units. The lower edge of the hood is adapted to co-operate with a strip 14 carried by the body of the vehicle and usually of L-construction in cross section.

In accordance with the present invention one or both sides of the hood 11 are adapted to be tilted in the manner indicated in Figure 1 whereby the rear edge of the hood will be raised above the cowl 12 and enable the heated air beneath the hood to issue above such cowl 12 in the manner of the arrows indicated in Figure 1 and against the windshield glass 13 to melt therefrom condensation, frost, snow, sleet and the like.

The usual clamps for holding the hood 11 in position are omitted for clearness, but in accordance with the present invention either the rear clamp or both clamps may be disengaged and an improved adjustable clamp device, such as illustrated in Figures 2, 3 and 4, is applied to the lower edge of the hood toward the rear portion thereof and to the body or joint strip 14.

Referring more particularly to Figures 2, 3 and 4, substantially U-shaped jaws are provided at the upper and lower portions of the clamp, such jaws being offset and directed in relatively opposite direction. The upper jaw is composed of parallel cheeks 15 and 16 which are separated a sufficient distance to permit reception therebetween of the lower edge of the hood 11 which is adapted to rest against the bottom connecting floor or cross strip 17 which unites the lower ends of the cheeks 15 and 16. A set screw 18 is threaded through one of the cheeks, for instance in cheek 16 which is the outer cheek. A shank 18 extends downwardly in the same plane with the cheek 15 and is adapted to mate with a similar upstanding shank 20 on the lower jaw member whereby the two jaw members may pivot angularly with respect to one another above the fulcrum bolt 21 which extends in common through both the overlapped shanks 19 and 20.

Preferably a spring washer 22 extends about the bolt 21 for engagement by the nut 23 at one side and one of the shanks at the opposite side. The washer 22 will place the nut 23 under tension and will tend to hold the nut against the bolt and thereby resist any casual turning of the nut 23 such as would loosen it incident to travel of the vehicle.

The cheeks of the lower jaw are indicated at 24 and 25 and the cross connecting pieces at 26, it being apparent that the lower jaw is constructed similarly to the upper jaw. A set screw 27 is threaded through one of the cheeks of the lower jaw, for instance the cheek 25, and it extends inwardly with respect to the hood.

In the use of the device, one or both sides of the hood may be raised, the lower clamp fitted at a desired point to the joint strip 14 with the set screw 27 extending inwardly. Such set screw is tightened to secure the clamp upon such joint strip 14. The hood 11 is then lowered until its lower edge is received between the cheeks 15 and 16 of the upper jaw and against the floor piece 17 thereof; whereupon the set screw 18 is tightened.

In adjusting the hood to the clamp, the bolt 21 is preferably loosened at least to a certain extent to permit the upper jaw to pivot about the lower jaw and to assume the position, for instance indicated in Figure 4, where the upper jaw has been canted to accord with the inclination given the lower edge of the hood 11. In this way such lower edge of the hood will lie in contact throughout along the floor or cross piece 17 of the upper clamp. During this adjusting and assembling movement, the lower clamp gives stability to the device and enables the operation to be carried out with ease and quickness. The set screw 18 for the bolt 21 may be tightened up simultaneously from the exterior of the hood.

It is obvious that various changes and modifications may be made in the details of construction and design of the above specifically described embodiment of this invention without departing from the spirit thereof, such changes and modifications being restricted only by the scope of the following claims.

What is claimed is:—

1. A device for holding the rear edge portion of an automobile hood in raised position to admit escape of heated air against the windshield of the automobile, comprising a body portion having a socket member at each end and with the socket members opening in opposite directions through the adjacent ends of the body portion, one socket member adapted for engagement over the lower edge of an automobile hood near the rear end thereof and the other socket member adapted for engagement over the hood stop strip on the body of the automobile, and clamps carried by the socket members for binding the same respectively to the hood and the stop strip.

2. A device for holding the rear edge portion of an automobile hood in raised position to admit escape of heated air against the windshield of the automobile, comprising a pair of socket members adapted to engage respectively with the lower edge of the automobile hood and the upper edge of the hood of the stop strip on the body of the automobile, each socket member having an offset shank at its inner end and said shanks adapted for overlapping relation to hold the socket members together, a pivot extending through the overlapping shanks to hold the latter together and admit of the swinging of the socket members into desired angular relation, said socket members having socket openings therein extending crosswise through the socket members and through the outer ends thereof in planes at right angles to the axis of said pivot whereby said socket members may be moved into angular relation to follow the angle of inclination between the lower edge of the automobile hood when raised and the adjacent portion of the body of the automobile.

3. A device for holding the rear edge portion of an automobile hood in raised position to admit escape of heated air against the windshield of an automobile, comprising a pair of socket members adapted respectively for engagement with the lower edge of an automobile hood and with the hood stop strip on the body of the automobile, said socket members each having an offset shank offset to one side of the socket member and having a flat face in parallel relation to the plane of the opening through the socket member, said shanks adapted to be disposed in overlapped relation with the socket members offset in opposite directions from the overlapping shanks whereby to dispose the upper socket member engaging the hood outwardly of the lower socket member engaging the stop strip, and a pivot engaging through the overlapping shanks for pivotally holding the same together on an axis at right angles to the plane of the socket opening.

EDWARD FIELDS PLUMB.